(12) United States Patent
Kobayashi et al.

(10) Patent No.: US 7,331,999 B2
(45) Date of Patent: Feb. 19, 2008

(54) METHOD OF PRODUCING SOLID ELECTROLYTIC CAPACITOR

(75) Inventors: Masaaki Kobayashi, Tokyo (JP); Syo Masujima, Tokyo (JP)

(73) Assignee: TDK Corporation, Tokyo (JP)

( * ) Notice: Subject to any disclaimer, the term of this patent is extended or adjusted under 35 U.S.C. 154(b) by 218 days.

(21) Appl. No.: 11/303,943

(22) Filed: Dec. 19, 2005

(65) Prior Publication Data

US 2006/0130300 A1 Jun. 22, 2006

(30) Foreign Application Priority Data

Dec. 21, 2004 (JP) ............................ P2004-370009

(51) Int. Cl.
*H01G 9/00* (2006.01)
(52) U.S. Cl. .............................. 29/25.03; 257/E21.008
(58) Field of Classification Search ................ 361/516, 361/540
See application file for complete search history.

(56) References Cited

U.S. PATENT DOCUMENTS 4,805,074 A * 2/1989 Harakawa et al. .......... 361/525
5,198,967 A * 3/1993 Kuranuki et al. ........... 361/523
6,249,424 B1 * 6/2001 Nitoh et al. ................ 361/523

FOREIGN PATENT DOCUMENTS

JP A 6-5477 1/1994

* cited by examiner

*Primary Examiner*—Michael Lebentritt
*Assistant Examiner*—Kyoung Lee
(74) *Attorney, Agent, or Firm*—Oliff & Berridge, PLC

(57) ABSTRACT

The invention provides a production method of a solid electrolytic capacitor capable of efficiently producing a solid electrolytic capacitor consisting of a stack of capacitor elements. For producing a solid electrolytic capacitor consisting of a stack of capacitor elements 2, plural sets of capacitor element groups 27 each consisting of a plurality of capacitor elements 2 arranged in a comb teeth pattern are first formed on one side of an aluminum strip 25. Subsequently, an electroconductive adhesive 15 is applied onto an electric conductor layer 12 of each capacitor element 2. Then the aluminum strip 25 is bent so as to be wound, to superimpose the respective capacitor elements 2 in the plural sets of capacitor element groups 27 on each other. Thereafter, in that state the electroconductive adhesive 15 applied previously is cured to form a plurality of capacitor element laminates 3. Next, the plurality of capacitor element laminates 3 are cut off and separated from the aluminum strip 25. This completes a plurality of capacitor element laminates 3.

4 Claims, 6 Drawing Sheets

METHOD OF PRODUCING SOLID ELECTROLYTIC CAPACITOR

BACKGROUND OF THE INVENTION

1. Field of the Invention

The present invention relates to a method of producing a solid electrolytic capacitor consisting of a stack of capacitor elements each of which has an anode part and a cathode part.

2. Related Background Art

A conventional production method of a multilayer solid electrolytic capacitor is, for example, one described in Japanese Patent Application Laid-Open No. 6-5477. The method described in this Application is the one in which a multilayer solid electrolytic capacitor is formed by connecting aluminum wires to anode parts of a plurality of single-plate solid electrolytic capacitors by welding and thereafter stacking the plurality of single-plate solid electrolytic capacitors in a zigzag folded shape.

SUMMARY OF THE INVENTION

However, since the above-described method of the conventional technology is to construct the multilayer solid electrolytic capacitor one by one from the plurality of single-plate solid electrolytic capacitors, it is inefficient and unsuitable for mass production.

An object of the present invention is to provide a production method of a solid electrolytic capacitor permitting efficient production of a solid electrolytic capacitor consisting of a stack of capacitor elements.

The present invention provides a method of producing a solid electrolytic capacitor consisting of a stack of capacitor elements each having an anode part and a cathode part, the method comprising a first step of forming plural sets of capacitor element groups each consisting of a plurality of capacitor elements arranged in a comb teeth pattern, on one side of a valve metal strip; a second step of bending the valve metal strip to superimpose the respective capacitor elements in the plural sets of capacitor element groups on each other, thereby forming a plurality of capacitor element laminates; and a third step of cutting off and separating the plurality of capacitor element laminates from the valve metal strip.

For example, supposing six solid electrolytic capacitors each consisting of a stack of three capacitor elements are produced by the production method of the solid electrolytic capacitor as described above, three sets of capacitor element groups each consisting of six capacitor elements arranged in a comb teeth pattern are first formed on one side of a valve metal strip. Then, for example, the valve metal strip is folded so as to superimpose respective six capacitor elements in the three sets of capacitor element groups on each other, thereby forming six capacitor element laminates of three-layer structure. Then the six capacitor element laminates are cut off and separated from the valve metal strip. This permits us to obtain the six three-layer solid electrolytic capacitors all at once. This enables efficient production of a plurality of multilayer solid electrolytic capacitors. At this time, the capacitor elements can be readily and accurately aligned with each other because the respective capacitor elements in the plural sets of capacitor element groups are superimposed on each other in a state in which the valve metal strip is not cut but bent.

Preferably, the second step comprises bonding the cathode parts of the respective capacitor elements in the plural sets of capacitor element groups to each other with an electroconductive adhesive. In this case, for example, the electroconductive adhesive is applied onto the cathode parts of the respective capacitor elements formed in the first step and in that state the respective capacitor elements in the plural sets of capacitor element groups are superimposed on each other, whereby the cathode parts of the respective capacitor elements can be readily fixed and electrically connected to each other.

Preferably, the second step comprises bending the valve metal strip so as to be wound, to superimpose the capacitor elements in the plural sets of capacitor element groups on each other. In this case, the valve metal strip can be readily wound, for example, by using a pair of rolls. At this time, as the valve metal strip is wound through the pair of rolls, two upper and lower flat portions of the valve metal strip are formed between the rolls. Therefore, if the valve metal strip is wound so as to locate the capacitor element groups in the flat portions of the valve metal strip, a plurality of capacitor element laminates will be formed in each of the two upper and lower flat portions. Therefore, it increases the number of capacitor element laminates that can be made at once, and thus the multilayer solid electrolytic capacitors can be produced more efficiently.

Furthermore, preferably, the first step comprises forming the anode part in a partial region of a valve metal electrode body integrated with the valve metal strip, and depositing a solid electrolyte layer and an electric conductor layer on a surface of a region except for the anode part in the valve metal electrode body to form the cathode part. In this case, the valve metal strip and a plurality of valve metal electrode bodies integrated therewith can be readily formed, for example, by a punching process of a valve metal sheet Then the anode parts of the capacitor elements can be formed all at once while the cathode parts of the capacitor elements can also be formed all at once, based on these valve metal electrode bodies.

DESCRIPTION OF THE PREFERRED EMBODIMENTS

The preferred embodiments of the production method of the solid electrolytic capacitor according to the present invention will be described below in detail with reference to the drawings.

Figure 1:
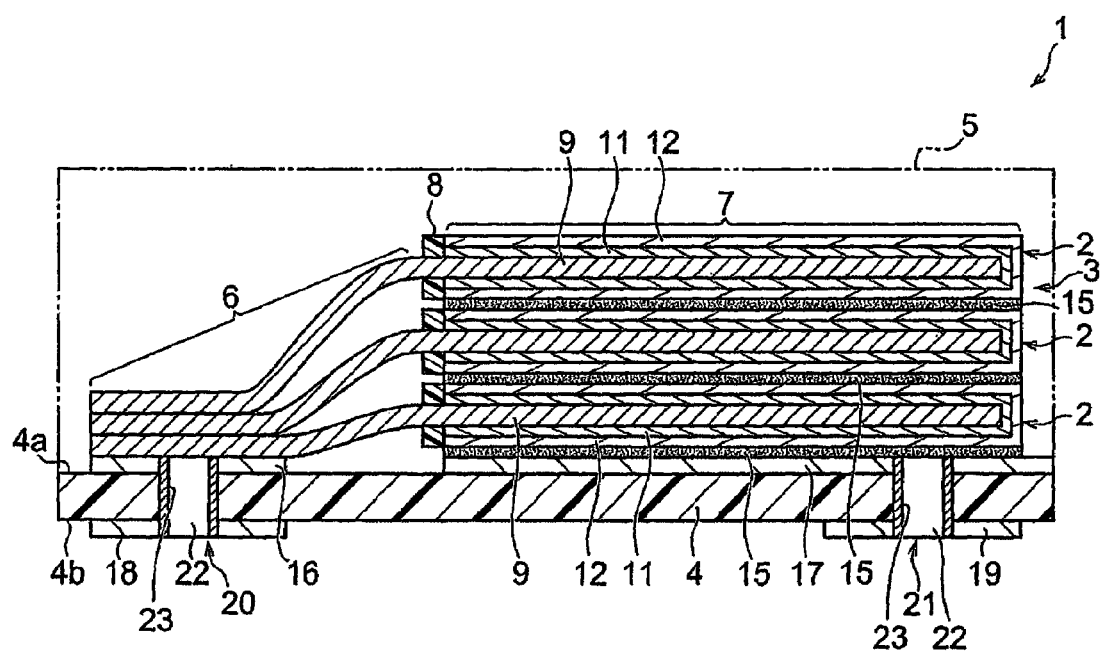
FIG. 1 is a sectional view showing a solid electrolytic capacitor produced by an embodiment of the solid electrolytic capacitor production method according to the present invention.

FIG. 1 is a sectional view showing a multilayer solid electrolytic capacitor produced by an embodiment of the production method of the solid electrolytic capacitor according to the present invention. In the same drawing, solid electrolytic capacitor 1 comprises a capacitor element laminate 3 consisting of a plurality of (three herein) capacitor elements 2; a substrate 4 on which the capacitor element laminate 3 is mounted and fixed; and a resin mold part 5 molding over the capacitor element laminate 3.

Figure 2:
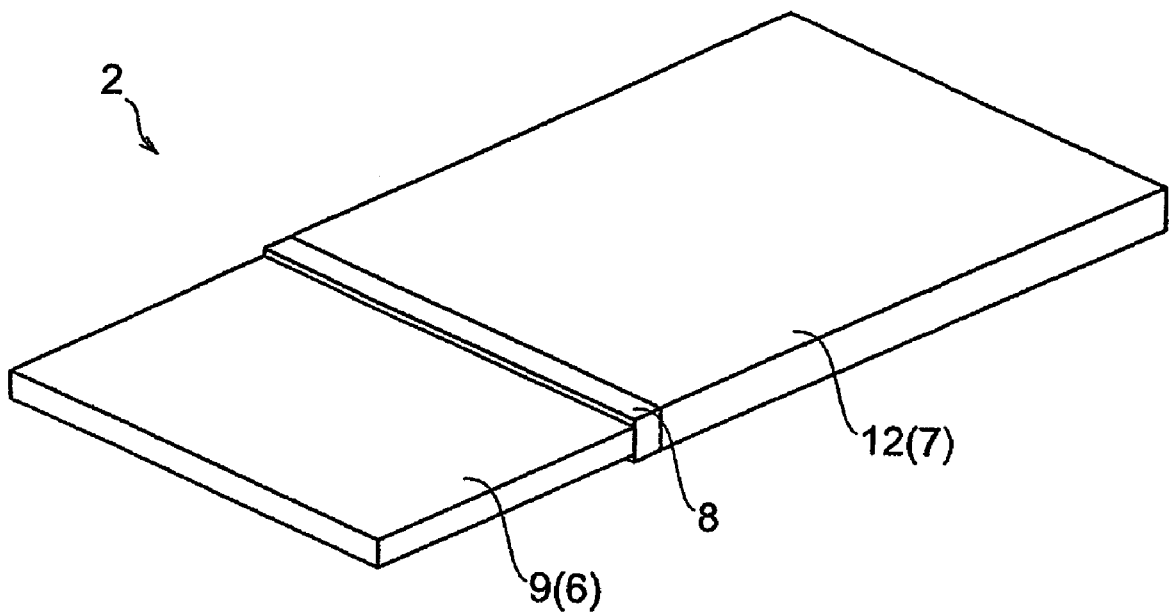
FIG. 2 is a perspective view of a capacitor element shown in FIG.
Figure 3:
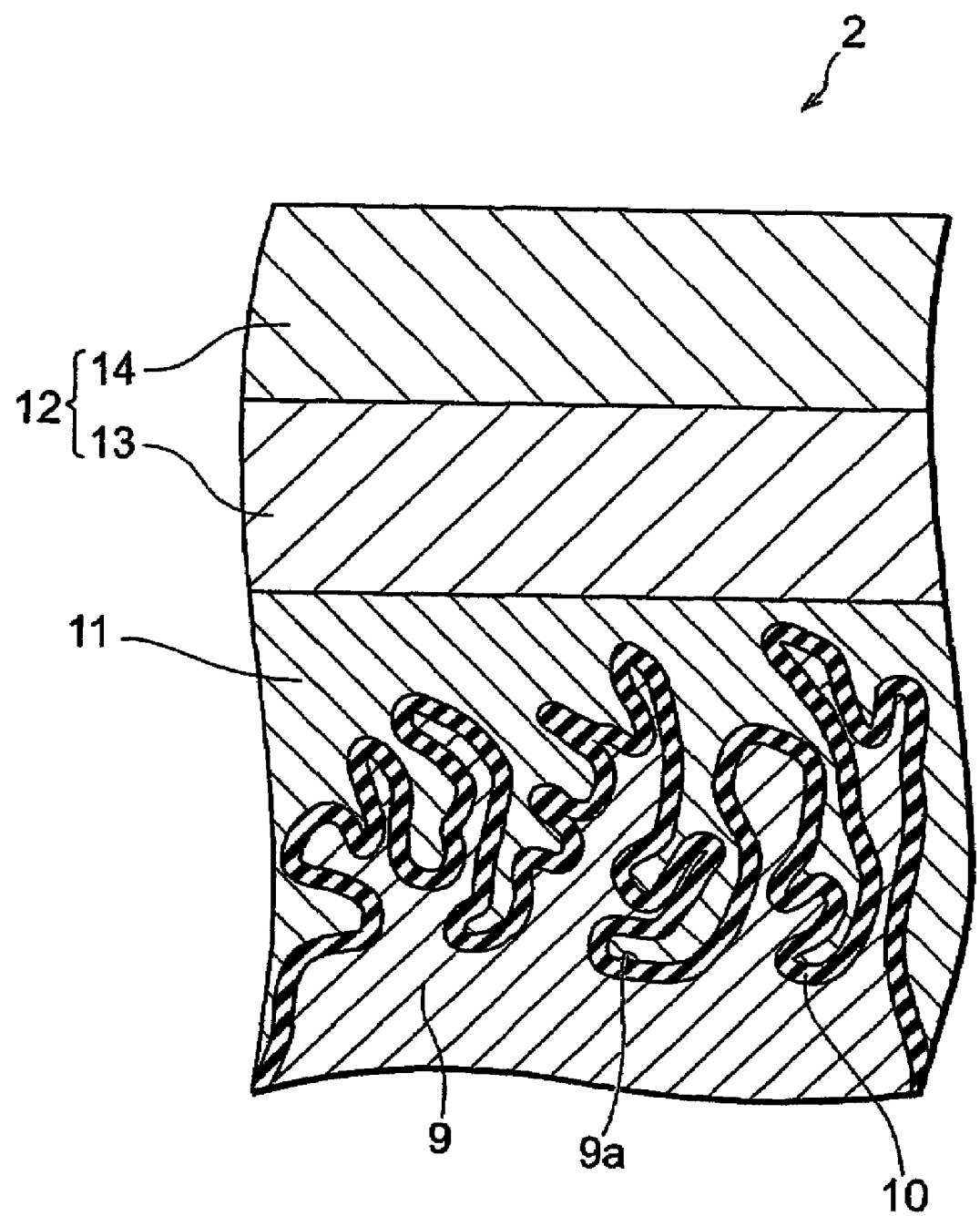
FIG. 3 is an enlarged sectional view showing the details of a partial structure of the capacitor element shown in FIG. 2.

A capacitor element 2, as shown in FIGS. 1 and 2, has an anode part 6, a cathode part 7, and an insulating part 8 formed between the anode part 6 and the cathode part 7. FIG. 3 shows the details of a part of the capacitor element 2.

In FIGS. 1 to 3, the anode part 6 is constructed of a portion on one end side of an aluminum electrode body 9 of foil shape or plate shape. The surface of the aluminum electrode body 9 is roughened to increase the surface area (surface area increase). An electrically insulating oxidation alumina coating (dielectric layer) 10 is formed on the surface of the aluminum electrode body 9 by anodization (anodic oxidation).

The roughened structure of the surface is broken in the anodized region where the anode part 6 is made in the aluminum electrode body 9. An insulating part 8, for example, of epoxy resin is formed at the base end of the region where the anode part 6 is made. A solid electrolyte layer 11 containing an electroconductive polymer compound is formed on the surface of the region except for the anode part 6 and insulating part 8 in the aluminum electrode body 9. This solid electrolyte layer 11 is formed in a state in which it enters into micropores 9a formed by the roughening process of the aluminum electrode body 9. An electric conductor layer 12 to form the cathode part 7 is provided on the solid electrolyte layer 11. The electric conductor layer 12 is made of a stack of graphite paste layer 13 and silver paste layer 14.

The capacitor element laminate 3 is constructed of a plurality of capacitor elements 2 stacked and fixed. Electric conductor layers 12 forming the cathode parts 7 of capacitor elements 2 are joined to each other with electroconductive adhesive 15. This electroconductive adhesive 15 is, for example, a silver-epoxy adhesive.

The substrate 4 on which the capacitor element laminate 3 is mounted is, for example, a printed circuit board of epoxy resin. On an upper surface 4a of the substrate 4 there are provided an anode wiring pattern 16 electrically connected to the anode parts 6 of the capacitor element laminate 3, and a cathode wiring pattern 17 electrically connected to the cathode parts 7 of the capacitor element laminate 3. These wiring patterns 16, 17 are made of copper or the like.

The cathode part 7 of the capacitor element 2 of the lowermost layer in the capacitor element laminate 3 is connected to the cathode wiring pattern 17 with the electroconductive adhesive 15. The anode parts 6 of the respective capacitor elements 2 in the capacitor element laminate 3 are welded in a bent and stacked state toward the substrate 4 to the anode wiring pattern 16 by welding means such as YAG laser spot welding.

On a lower surface 4b of the substrate 4 there are provided an anode terminal pattern 18 and a cathode terminal pattern 19. These terminal patterns 18, 19 are portions to be mounted on an electronic circuit board or the like (not shown) and are made of a metal material similar to that of the wiring patterns 16, 17.

The substrate 4 is provided with a through-hole 20 electrically connecting the anode wiring pattern 16 with the anode terminal pattern 18, and a through-hole 21 electrically connecting the cathode wiring pattern 17 with the cathode terminal pattern 19. These through-holes 20, 21 are made, for example, by forming penetrating holes 22 in the substrate 4 by drilling and thereafter forming a plated layer 23 on the internal wall surface of the penetrating holes 22 in the substrate 4.

Figure 5:
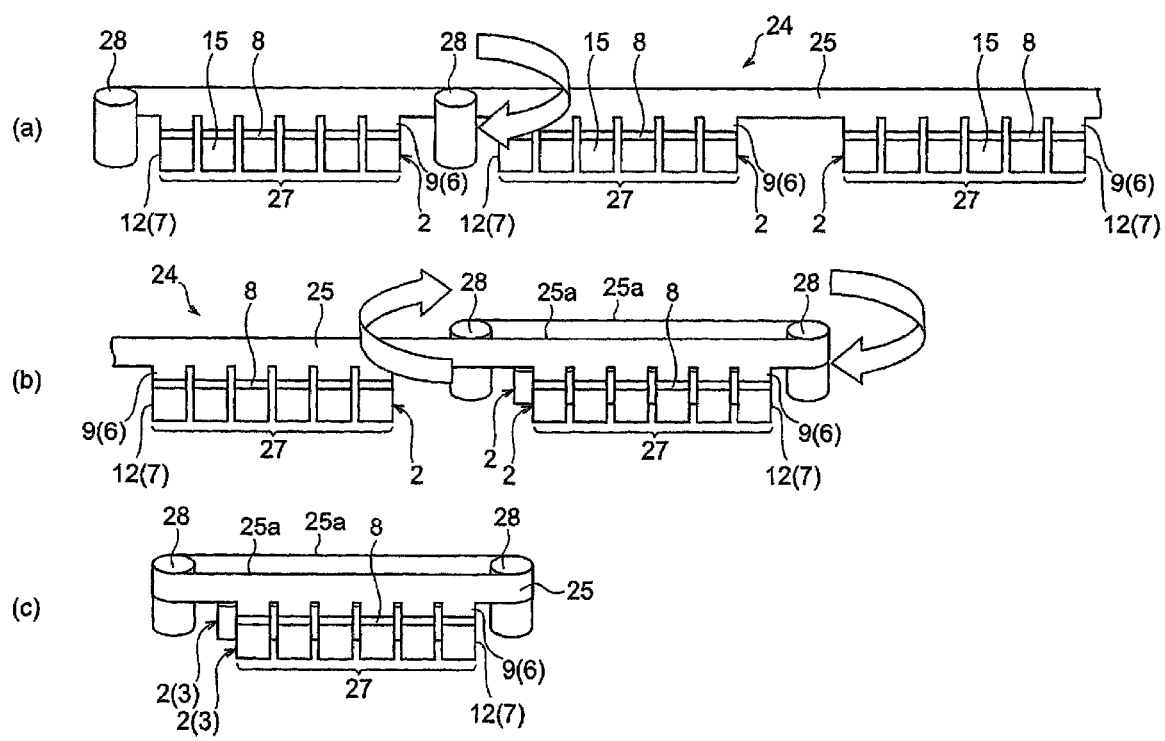
FIG. 5 is an illustration showing steps in an embodiment of the solid electrolytic capacitor production method according to the present invention.
Figure 6:
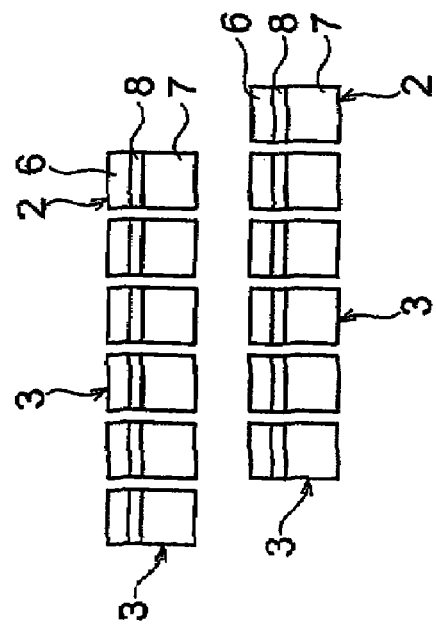
FIG. 6 is an illustration showing steps in an embodiment of the solid electrolytic capacitor production method according to the present invention.
Figure 6:
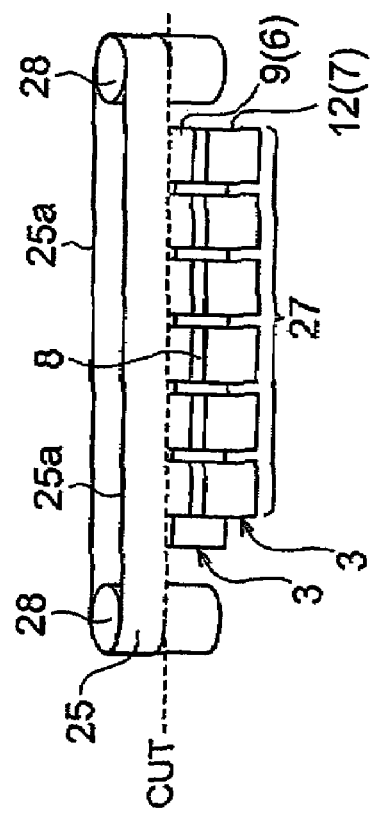

Next, a method of producing the above-described solid electrolytic capacitor 1 will be described. In the production method of the solid electrolytic capacitor 1, a plurality of capacitor element laminates 3 are produced all at once as shown in FIGS. 4 to 6.

Figure 4:
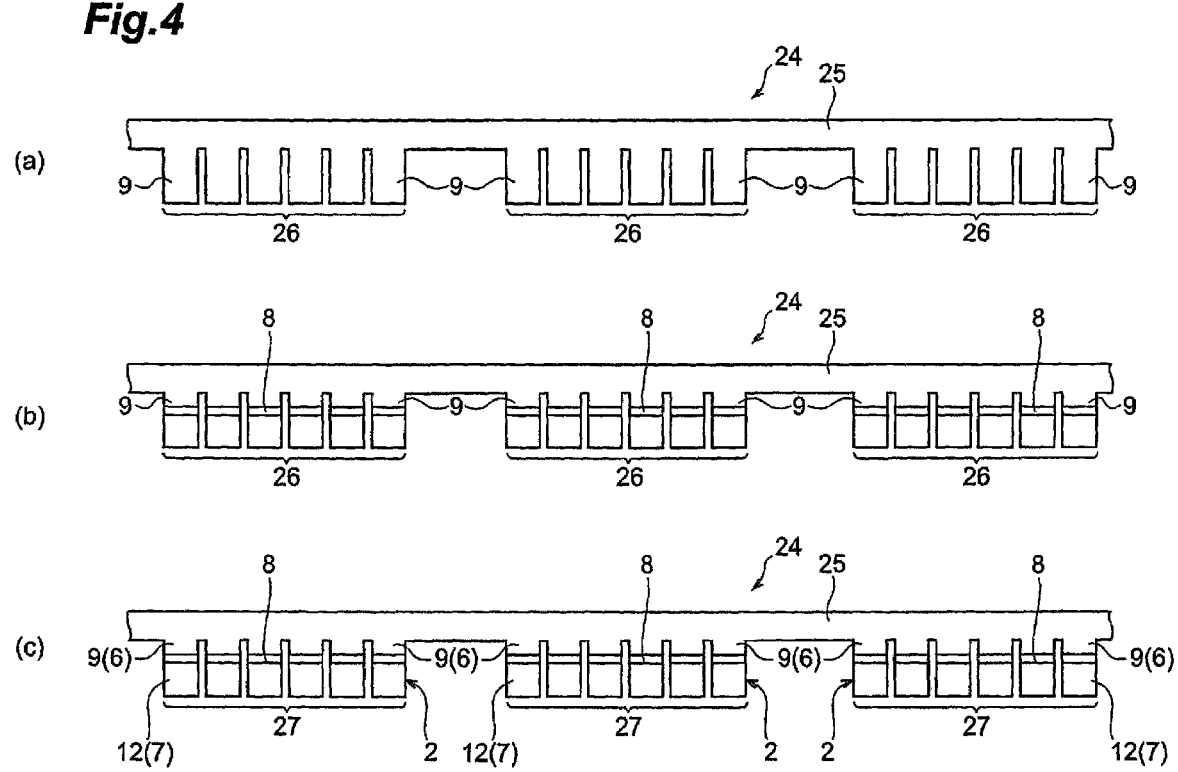
FIG. 4 is an illustration showing steps in an embodiment of the solid electrolytic capacitor production method according to the present invention.

Specifically, an aluminum sheet is first prepared, the surface of this aluminum sheet is roughened, and anodization (anodic oxidation) is effected to form an insulating oxidation alumina coating on the surface of the aluminum sheet Then the aluminum sheet is punched in a shape as shown in FIG. 4(*a*), to form an aluminum base 24. The aluminum base 24 is composed of an aluminum strip 25, and a plurality of aluminum electrode body groups 26 formed at predetermined intervals on one side of the aluminum strip 25. Each aluminum electrode body group 26 is composed of a plurality of (six in FIG. 4) aluminum electrode bodies 9 arranged in a comb teeth pattern on one side of the aluminum strip 25. The aluminum electrode bodies 9 in one aluminum electrode group 26 are arrayed at an equal pitch.

Next, as shown in FIG. 4(*b*), an epoxy resin is applied onto a predetermined region of each aluminum electrode body 9 in the aluminum base 24 by screen printing or the like to form an insulating part 8.

Then a solid electrolyte layer 11 containing an electroconductive polymer compound is formed over a region on the distal end side with respect to the insulating part 8 in each aluminum electrode body 9 by chemical oxidation polymerization. This solid electrolyte layer 11 is formed, for example, by impregnating micropores 9a of aluminum electrode body 9 with a monomer and thereafter effecting chemical oxidation polymerization or electrolytic oxidation polymerization thereof. Subsequently, a graphite paste layer 13 and a silver paste layer 14 are successively deposited on the surface of the solid electrolyte layer 11 to form an electric conductor layer 12. This step of forming the electric conductor layer 12 is performed, for example, by one of a screen printing method, an impregnating method (dipping), and a spray coating method.

This results in forming a cathode part 7, as shown in FIG. 4(*c*), in each aluminum electrode body 9. Consequently, a plurality of capacitor element groups 27, each consisting of a plurality of capacitor elements 2 arranged in a comb teeth pattern, are formed on one side of the aluminum strip 25.

Then, as shown in FIG. 5(*a*), an electroconductive adhesive 15 is applied onto the electric conductor layer 12 of each capacitor element 2. Subsequently, two rolls 28 with the same diameter are, prepared, and these rolls 28 are located on both sides of one capacitor element group 27 in the aluminum strip 25. Thereafter, as shown in FIG. 5(*b*), the aluminum strip 25 is bent so as to be folded back around a roll 28. This results in locating two sets of capacitor element groups 27 in two upper and lower flat portions 25a of the aluminum strip 25 formed between two rolls 28.

Thereafter, as shown in FIG. 5(*c*), the aluminum strip 25 is further bent so as to be wound around the two rolls 28, to superimpose six capacitor elements 2 constituting plural sets of capacitor element groups 27, on each other. This process of winding the aluminum strip 25 is performed three times according to the number of capacitor elements 2 stacked (three layers herein). This results in forming six stacks of three capacitor elements 2 in two flat portions 25a of the aluminum strip 25 between two rolls 28.

Then the electroconductive adhesive 15 applied previously is cured in the state in which the aluminum strip 25 is wound, whereby the cathode parts 7 of the respective capacitor elements 2 are bonded in the plural sets of capacitor element groups 27. This results in forming capacitor element laminates 3 of three-layer structure six each up and down.

Then, as shown in FIG. 6, each capacitor element laminate 3 is cut off and separated from the aluminum strip 25. This completes twelve capacitor element laminates 3 in total.

The step shown in FIG. 4 corresponds to the first step of forming plural sets of capacitor element groups 27 each consisting of a plurality of capacitor elements 2 arranged in a comb teeth pattern, on one side of valve metal strip 25. The step shown in FIG. 5 corresponds to the second step of bending the valve metal strip 25 and superimposing the respective capacitor elements 2 in the plural sets of capacitor element groups 27 on each other to form the plurality of capacitor element laminates 3. The step shown in FIG. 6 corresponds to the third step of cutting off and separating the plurality of capacitor element laminates 3 from the valve metal strip 25.

The second step shown in FIG. 5 is to wind the aluminum strip 25 around two rolls 28, but it is also possible, for example, to use a thin plate member or the like stretched in an endless state on two rolls. In this case, the aluminum strip 25 is wound along the thin strip member or the like, and it is thus easy to form the flat portions 25a in the two regions in the aluminum strip 25.

Thereafter, in a state in which a capacitor element laminate 3 is mounted on a separately prepared substrate 4, the cathode part 7 of the lowermost capacitor element 2 in the capacitor element laminate 3 is bonded to cathode wiring pattern 17 with electroconductive adhesive 15. In addition, the anode part 6 of each capacitor element 2 in the capacitor element laminate 3 is bent toward the substrate 4 and in that state each anode part 6 is joined to anode wiring pattern 16 by YAG laser spot welding or the like. Then a resin mold layer 5 is formed by casting, injection, transfer molding, or the like. The above completes one solid electrolytic capacitor 1.

In the present embodiment, as described above, plural sets of capacitor element groups 27 each consisting of a plurality of capacitor elements 2 arranged in a comb teeth pattern are formed on one side of the aluminum strip 25, the aluminum strip 25 is then bent so as to be wound, to superimpose the respective capacitor elements 2 in the plural sets of capacitor element groups 27 on each other, thereby forming a plurality of capacitor element laminates 3, and thereafter the plurality of capacitor element laminates 3 are cut off and separated from the aluminum strip 25. Since the plurality of capacitor element laminates 3 are not made one by one but are made all at once, the plurality of capacitor element laminates 3 can be efficiently and readily produced. Therefore, this method is advantageous in mass production of solid electrolytic capacitor 1 and also leads to reduction of production cost.

If the respective capacitor elements 2 in plural sets of capacitor element groups 27 are arranged to be superimposed after they are cut off from the aluminum strip 25 in each capacitor element group 27, alignment between upper and lower capacitor elements 2 will take a lot of trouble. However, since the present embodiment is arranged to wind the aluminum strip 25 without being cut and to superimpose the respective capacitor elements 2 in the plural sets of capacitor element groups 27 on each other, alignment can be readily and accurately performed between upper and lower capacitor elements 2.

The present invention is not limited to the above embodiment. For example, the above embodiment is arranged to bend the aluminum strip 25 so as to be wound by use of two rolls 28 and to superimpose the respective capacitor elements 2 in plural sets of capacitor element groups 27 on each other, but it is also possible to wind the aluminum strip 25 without the use of two rolls 28. For example, a potential method is to prepare one roll with a large diameter and to wind the aluminum strip 25 around this roll. In this case, a plurality of capacitor elements 2 can be continuously formed along the roll, whereby a plurality of capacitor elements 2 can be formed without waste relative to the aluminum strip 25. Another potential method is to simply bend or fold the aluminum strip 25 so as to superimpose the respective capacitor elements 2 in plural sets of capacitor element groups 27 on each other.

The above embodiment uses the aluminum electrode body 9 as the valve metal electrode body forming the anode part 6 of each capacitor element 2, but the valve metal electrode body may be made of any other metal material than aluminum; e.g., an aluminum alloy, titanium, tantalum, niobium, and zirconium, or alloys of these metals. In this case, it is needless to mention that the valve metal strip used for production of a plurality of capacitor element laminates altogether is one made of the same metal material as the valve metal electrode body and integrally formed with the valve metal electrode body.

Furthermore, the solid electrolytic capacitor 1 of the above embodiment is a 2-terminal type capacitor with the anode part 6 and cathode part 7 one each, and the present invention can also be applied to multi-terminal type capacitors with a plurality of anode parts.

In addition, the solid electrolytic capacitor 1 of the above embodiment is one in which the capacitor element laminate 3 is fixed to the substrate 4, and the present invention can also be applied to lead-flame type solid electrolytic capacitors, and solid electrolytic capacitors consisting of only a capacitor element laminate.

EXAMPLE

Solid electrolytic capacitors according to the above embodiment were produced as described below.

(1) Fabrication of Aluminum Electrode Bodies

First prepared was a reeled aluminum foil of strip shape 0.01 mm thick and 20 mm wide. This aluminum foil was one subjected to the roughening process and provided with an insulating oxidation alumina coating. The aluminum foil was supplied to a punching press machine to form and process ten aluminum electrode bodies in a comb shape in a region of a predetermined length (70 mm). Then the aluminum foil was freely run by a predetermined distance (about 30 mm), and then ten aluminum electrode bodies were formed and processed again in the comb shape in a region of the predetermined length. This process was repeated eight times in total. Finally, the aluminum foil was cut off from the reel. This resulted in obtaining an aluminum base composed of an aluminum strip and a plurality of aluminum electrode bodies (cf. FIG. 4(a)).

(2) Formation of Resin Layer (Insulating Part)

In each aluminum electrode body of the aluminum base, an epoxy resin was applied to the position of 4.7 mm from the tip thereof by screen printing, and then dried and cured to form a resin layer in the width of 0.5 mm (cf. FIG. 4(b)).

(3) Formation of Oxidation Alumina Coating, Electroconductive Solid Polymer Electrolyte Layer, and Electric Conductor Layer Each aluminum electrode body was immersed so as to completely soak the resin layer, in an aqueous ammonium adipate solution controlled in the concentration of 3 wt % and pH of 6.0. Then, using the aluminum strip not immersed, as an anode, each aluminum electrode body in the aqueous solution was oxidized under the conditions of anodization current density of 50-100 mA/cm$^2$ and anodization voltage of 6 V to form an alumina coating on an end face of cut part of the electrode body.

Thereafter, the aluminum electrode body was drawn up from the interior of the aqueous solution and a solid polymer electrolyte layer of polypyrrole was formed on the surface of the electrode body subjected to the roughening process (cathode-forming region) by chemical oxidation polymerization. Specifically, only the aluminum foil part subjected to the roughening process and provided with the alumina coating was impregnated with a monomer solution of pyrrole, and the electrode body was set in an ethanol-water mixed solution cell containing purified 0.1 mol/l sodium alkyl naphthalene sulfonate and 0.05 mol/l iron (III) sulfate. Then the chemical oxidation polymerization was made to proceed under agitation for 30 minutes and the same operation was repeated three times to generate the solid polymer electrolyte layer. This resulted in forming the solid polymer electrolyte layer with the maximum thickness of about 10 μm.

Then a carbon paste is applied onto only the surface of the solid polymer electrolyte layer by dipping, and a silver paste was further applied onto the surface of the carbon paste by dipping, thereby forming the cathode part. The above process resulted in obtaining eight sets of capacitor element groups each consisting of a plurality of capacitor elements (cf. FIG. 4(c)).

(4) Lamination of Capacitor Elements

A silver-epoxy electroconductive adhesive was spotted onto the conductor layer (silver paste layer) of each capacitor element produced as described above (cf. FIG. 5(a)).

Thereafter, the aluminum strip was wound around two rolls (cf. FIG. 5(b)). At this time, the aluminum strip was so set that ten capacitor elements formed in the region of the predetermined length (70 mm) had no sag and that ten capacitor elements were located in the two flat portions of the aluminum strip formed between two moving rolls. Then the aluminum strip was wound by a predetermined number of turns so that the respective capacitor elements in the different capacitor element groups were superimposed without positional deviation. As a result, ten sets in each of which four capacitor elements were stacked were obtained in each of the two flat portions of the aluminum strip formed between the two moving rolls (cf. FIG. 5(c)).

(5) Production of Capacitor Element Laminates

While maintaining the wound state of the aluminum strip, the electroconductive adhesive applied between the conductor layers of the respective capacitor elements stacked was dried and cured. This resulted in forming the capacitor element laminates each consisting of a fixed stack of four capacitor elements, ten each up and down. Thereafter, each capacitor element laminate was cut off at the position of 1 mm on the aluminum strip side from the resin layer in each capacitor element laminate, from the aluminum strip. This resulted in completing twenty capacitor element laminates (cf. FIG. 6).

(6) Production of Board

A glass cloth-containing heat-resistant epoxy resin substrate (hereinafter referred to as an FR4 substrate) coated with copper foil 36 μm thick on both sides was cut out in the size of 100 mm×100 mm and a wiring pattern in the size of 7.3 mm×4.3 mm was patterned on one side (upper surface) by photolithography. Ninety six patterns of this size were formed on the same surface. Terminal patterns were also patterned on the lower surface of the FR4 substrate by photolithography while being aligned with the wiring patterns.

Subsequently, a plurality of penetrating holes (0.3 mmφ) for connection between the wiring patterns formed on the upper surface of the FR4 substrate and the terminal patterns formed on the lower surface of the FR4 substrate were formed. Next, a nickel-plated layer 3 μm thick was deposited on inner walls of the FR4 substrate forming the penetrating holes, by electroless plating, and a gold-plated layer 0.8 μm thick was further deposited thereon to form through-holes.

(7) Mounting of Capacitor Element Laminate on Substrate

The capacitor element laminates produced previously were mounted on the FR4 substrate and the cathode part (paste layer) exposed in the lowermost surface of each laminate was bonded to the cathode wiring pattern with a silver-epoxy electroconductive adhesive. Each anode part of the capacitor element laminate was welded to the anode wiring pattern with a YAG laser welder available from NEC Corp, to be integrated therewith.

Thereafter, the capacitor element laminates mounted and fixed in predetermined regions on the FR4 substrate were subjected to molding with an epoxy resin by a casting mold using vacuum printing.

In a state in which the mold surface of the FR4 substrate in the size of 100 mm×100 mm thus molded was kept up, dicing cutting was conducted at intervals of 7.3 mm×4.3 mm on the basis of predetermined marking positions. Then cleaning was conducted to obtain samples of 2-terminal type solid electrolytic capacitors of a discrete type incorporating the capacitor element of 7.3 mm×4.3 mm. Thereafter, a fixed voltage was applied to the solid electrolytic capacitors by a known method to perform an aging process to adequately reduce leak current, thereby completing samples of solid electrolytic capacitors.

(8) Evaluation

Concerning electric characteristics of twenty samples obtained in this way, measurements were conducted to measure the leak current value, the equivalent series resistance (ESR) value at 100 kHz, and the capacitance value at 120 Hz. The measurement technique of leak current was already known: a dc stabilized power supply capable of applying a rated voltage (4 V) to the solid electrolytic capacitor experimentally produced, and an ammeter were prepared, and the solid electrolytic capacitor was connected thereto according to polarities of the power supply. On that occasion, a resistor of 1 kΩ as a protection circuit, together with the ammeter, was connected in series. Then the number of samples having reached a current value of not more than a fixed standard value was counted, five minutes after the time of turning on the power supply. In addition, the ESR value and the capacitance value were measured using an impedance analyzer 4194 A available from Agilent Technologies, As a result, there were eighteen samples satisfying the standard value of leak current (not more than 40 μA), twenty samples satisfying the standard value of capacitance (100 μF±20%), and nineteen samples satisfying the ESR value (not more than 10 mΩ).

The above result confirmed an improvement in the lamination step of capacitor elements and achievement of expected characteristics of the stack of capacitor elements, thus verifying the effect of the production method of the solid electrolytic capacitor according to the present invention.

The present invention permits us to efficiently produce a plurality of solid electrolytic capacitors each consisting of a stack of capacitor elements, all at once. This makes it feasible to quickly realize mass production of solid electrolytic capacitors.

What is claimed is:

1. A method of producing a solid electrolytic capacitor consisting of a stack of capacitor elements each having an anode part and a cathode part, comprising:
   a first step of forming plural sets of capacitor element groups each consisting of a plurality of said capacitor elements arranged in a comb teeth pattern, on one side of a valve metal strip;
   a second step of bending the valve metal strip to superimpose the respective capacitor elements in the plural sets of capacitor element groups on each other, thereby forming a plurality of capacitor element laminates; and
   a third step of cutting off and separating the plurality of capacitor element laminates from the valve metal strip.

2. The production method of the solid electrolytic capacitor according to claim 1, wherein the second step comprises bonding the cathode parts of the respective capacitor elements in the plural sets of capacitor element groups to each other with an electroconductive adhesive.

3. The production method of the solid electrolytic capacitor according to claim 1, wherein the second step comprises bending the valve metal strip so as to be wound, to superimpose the capacitor elements in the plural sets of capacitor element groups on each other.

4. The production method of the solid electrolytic capacitor according to claim 1, wherein the first step comprises forming the anode part in a partial region of a valve metal electrode body integrated with the valve metal strip, and depositing a solid electrolyte layer and an electric conductor layer on a surface of a region except for the anode part in the valve metal electrode body to form the cathode part.

* * * * *

UNITED STATES PATENT AND TRADEMARK OFFICE
CERTIFICATE OF CORRECTION

PATENT NO.        : 7,331,999 B2                                          Page 1 of 1
APPLICATION NO. : 11/303943
DATED             : February 19, 2008
INVENTOR(S)       : Masaaki Kobayashi and Syo Masujima It is certified that error appears in the above-identified patent and that said Letters Patent is hereby corrected as shown below:

Title Page; should read;

(73)   TDK Corporation, Tokyo (JP);
       Syo MASUJIMA, Tokyo (JP)

Signed and Sealed this

Eleventh Day of November, 2008

JON W. DUDAS
*Director of the United States Patent and Trademark Office*